United States Patent [19]

I'Anson et al.

[11] Patent Number: 5,347,524
[45] Date of Patent: Sep. 13, 1994

[54] PROTOCOL ANALYZER

[75] Inventors: Colin S. I'Anson, Stoke Gifford; Neil McKee, Horfield, both of United Kingdom; James R. Galloway, Holzgerlingen, Fed. Rep. of Germany

[73] Assignee: Hewlett-Packard Company, Palo Alto, Calif.

[21] Appl. No.: 757,973

[22] Filed: Sep. 12, 1991

[30] Foreign Application Priority Data

Sep. 13, 1990 [EP] European Pat. Off. ........ 90310017.0

[51] Int. Cl.$^5$ .......................... G06F 11/00; H04J 3/00
[52] U.S. Cl. ................... 371/29.1; 371/20.1; 395/200
[58] Field of Search ............... 371/20.1, 23, 25.1, 371/29.1; 395/200, 575; 370/13, 85.1, 94.1, 95.2

[56] References Cited

U.S. PATENT DOCUMENTS

| | | | |
|---|---|---|---|
| 4,748,348 | 5/1988 | Thong | 307/517 |
| 4,792,753 | 12/1988 | Iwai | 370/85.1 X |
| 4,998,240 | 3/1991 | Williams | 370/13 X |
| 5,027,343 | 6/1991 | Chan et al. | 371/20.1 X |
| 5,097,469 | 3/1992 | Douglas | 371/20.1 |
| 5,197,127 | 3/1993 | Waclawsky et al. | 395/200 |

FOREIGN PATENT DOCUMENTS

| | | |
|---|---|---|
| 0332286 | 9/1989 | European Pat. Off. |
| 0371656 | 6/1990 | European Pat. Off. |
| WO90/14725 | 11/1990 | PCT Int'l Appl. |

Primary Examiner—Kevin J. Teska

[57] ABSTRACT

A protocol analyzer is provided for monitoring a selected communication connection being conducted in accordance with a predetermined protocol by the exchange of protocol data units between two entities over a data network. The analyzer includes a monitoring device for identifying protocol data units, a protocol-follower conditioned in dependence on said predetermined protocol and operative to follow the progress of the connection as it receives relevant protocol data units from the monitoring device, and an alarm indicating when the sequence of protocol data units diverges from the protocol. The protocol data units are passed through a FIFO store as they are used by the protocol-follower, so that on a protocol violation occurring, the sequence of protocol data units leading up to the violation can be extracted from the FIFO store and displayed. The protocol analyzer thus filters out protocol data units conforming to the relevant protocol so that only protocol data units violating the protocol, together with the immediately preceding protocol data units, are displayed.

20 Claims, 4 Drawing Sheets

PROTOCOL ANALYZER

BACKGROUND OF THE INVENTION

1. Field of the Invention

The present invention relates to a protocol analyzer for monitoring a selected communication between two entities on a data network in accordance with a predetermined protocol.

2. Description of the Prior Art

A data network is a network (with or without nodes performing switching functions) interconnecting a plurality of data processing devices. Such networks are often used to interconnect a number of computers, but can also be used for other data communication purposes, such as telephone-type networks.

Information is generally transmitted in the form of messages, and an individual message will often be divided into a number of discrete packets. In such a network, the routing of the packets may be at least partially controlled or determined by the various nodes in the network. In some cases, the route taken by the packets of a message is fixed for a connection, and all packets follow that route. In others, the various packets for a connection may follow different routes through the network. Usually, a number of packets of different connections will be interleaved on any particular link between two adjacent nodes in the network.

Such networks tend to suffer from faults. Both cause and effect of a fault may be immediately evident. For example, the physical linkage between two nodes may be interrupted; or no packets may be received from a particular node. However, network faults are often subtle in both their causes and effects, and it may even not be clear whether there is a fault or not. For example, a poor response time of the network may be due to a fault or an unusual and extreme workload imposed on it.

A variety of instruments are available for network fault diagnosis (using the term "diagnosis" in a broad sense). At the lowest level, there are voltage level testers, continuity testers, etc. At a slightly higher level, there are signal presence testers such as LED instruments.

However, many network faults occur at a higher level and take the form of a violation of the operating procedure or protocol, which the communicating entities have generally implicitly agreed. Matters are further complicated by the fact that when, for example, two computers communicate over a network, they generally do so using a multi-layered protocol stack to format and control the communication process. In such cases, at least conceptually, a protocol entity of each layer of the protocol stack of one computer communicates with a corresponding protocol entity of the same layer of the other computer, this communication being by the exchange of so-called "protocol data units" that carry control information relevant to the protocol layer concerned as well as user data. Thus, several protocols, each at a different level, are concurrently in use, any one of which could give rise to a communication fault.

Because a protocol is describable in terms of a set of states with transitions between the determined states, at least in part, by the type of protocol data unit received (this type being set by the control information of the protocol data unit), it is possible to identify protocol violations by examining the sequence of protocol data units passing over the network between the relevant pair of communicating entities. A protocol analyzer is an instrument designed to carry out such a task.

In using a protocol analyzer, the analyzer is attached to a suitable point in the network. It detects and analyses packets to produce a listing of the protocol data units relevant to the protocol being monitored (generally a low-level, e.g., link level protocol). By inspecting this listing, the operator can see the nature of the traffic at the point and recognize various kinds of errors.

The simplest form of listing is a listing of all protocol data units associated with the protocol being monitored. However, analysis of such a "raw" listing is an onerous task. There will usually be a large variety of sets of such protocol data units passing any given point in the network, each set having a different source and/or destination entity. Further, both the number and the complexity of the protocols used in a typical large system are not easy to manage.

It has therefore been known to make the data collection by protocol analyzers "programmable." That is, the analyzer can be programmed by the user to respond only to conditions determined by the user. These conditions can be regarded as a filter which operates on the input data stream, and can be described as "mask" filtering.

The user can thereby select only protocol data units passing between two selected protocol entities. The user can also set the analyzer to respond only to certain sequences of protocol data units; obviously, the chosen sequences will usually be those indicative of errors or abnormal conditions. As just noted, however, the complexity of a protocol can often be high, and the number of protocols or variations thereof is also liable to be large. Thus programming the analyzer is an arduous task, and the user is quite likely to program it so as to detect only a limited number of "likely" abnormal conditions, and to rely on a continuous scrolling display of all protocol data units to detect other abnormal conditions.

It is an object of the present invention to provide a protocol analyzer that facilitates the task of detecting protocol violations.

SUMMARY OF THE INVENTION

According to the present invention, there is provided a protocol analyzer for monitoring a selected communication connection being conducted in accordance with a predetermined protocol between two entities by the exchange of protocol data units over a data network. The protocol is a cyclically-operating, multiple-state protocol state-to-state transitions of which are caused by differing types of protocol data units, and the network can support a plurality of simultaneous communication connections between different pairs of entities. The protocol analyzer comprises monitoring means, protocol-follower means and alarm means. Monitoring means monitors the network to derive protocol-unit signals indicative of protocol data units relevant to the selected connection. Protocol-follower means includes current-state memory means for storing an indication of the current protocol state of the selected connection. The protocol-follower means is conditioned in dependence on the states of the protocol. The valid types of protocol data units are determined for each state, and any resulting change in state is caused by each validly-received protocol data unit to follow the execution of the protocol in relation to the selected connection based upon the protocol-unit signal and the current protocol state as indicated by the current-state memory means. The protocol-follower means is operative to update the indication of the current protocol state as appropriate. Alarm means is operatively associated with the protocol-follower means and arranged to generate an output indication when a relevant protocol data unit, as represented by the corresponding protocol-unit signal, is an invalid one for the current protocol state.

Due to this arrangement, all protocol violations will be detected without each possible violation having to be separately programmed into the protocol analyzer and without the user being required to monitor a listing of protocol data units the vast majority of which conform to the protocol.

The protocol-follower means and alarm means together form what may be termed a "context" or "behavioural" filter.

Preferably, the protocol-follower means is conditioned in dependence on the protocol as considered in terms of the possible states of the overall connection having regard solely to protocol data units exchangeable between the entities. However, it is also possible for the protocol-follower to be conditioned in dependence on the protocol as considered at the communicating entities. That is, the protocol-follower means is operative to separately track the progress of the connection of each communicating entity. The current protocol state of each entity is held in the current-state memory means.

Generally, the relevant protocol information will be stored in a state memory in the protocol-follower means. However, it would also be possible to provide dedicated hardware emulating a protocol state machine. In the former case, the state memory advantageously comprises a two-dimensional look-up table accessed by current state and protocol-data-unit type as indicated by the protocol-unit signal. The table has for each state, a valid-unit entry for each protocol-data-unit type and an invalid-unit entry for invalid protocol-data-unit types. Each of the valid-unit entry indicates the protocol state following receipt of that protocol-data-unit type concerned.

The protocol analyzer may include output means which is controlled by the alarm means to generate a protocol-data-unit-representing output only for invalid protocol data unit. Alternatively, the output means can be arranged to generate a protocol-data-unit-representing output for each relevant protocol data unit. The output means is controlled by the alarm means to distinguish invalid protocol data units for valid protocol data units. As a further alternative, the output means may operate to generate a protocol-data-unit-representing output for each of a limited number of valid relevant protocol data units that immediately precede an invalid protocol data unit as well as for the invalid protocol data unit itself.

In order to permit the user to change what is considered a violation (for example, where the protocol actually in use is a variant of the one conditioning the protocol-follower), the conditioning of said protocol-follower means is preferably user modifiable.

Advantageously, the protocol-follower means is so conditioned as to permit the user to select predetermined protocol data units that are otherwise valid in particular protocol states, for identification by said alarm means when occurring in those states (these predetermined units, are, for example, ones that are unusual, though valid, in a particular state). Operation without this feature would result in the detection of only strictly protocol-violating events ("strong filtering"), while operation with the feature selected would result in the automatic detection of the permitted but unusual sequences as well ("weak filtering"). The permitted but unusual sequences could of course be indicated in a manner distinguishing them from the strictly forbidden sequence.

DETAILED DESCRIPTION OF THE PRESENTLY PREFERRED EMBODIMENT

Figure 1:
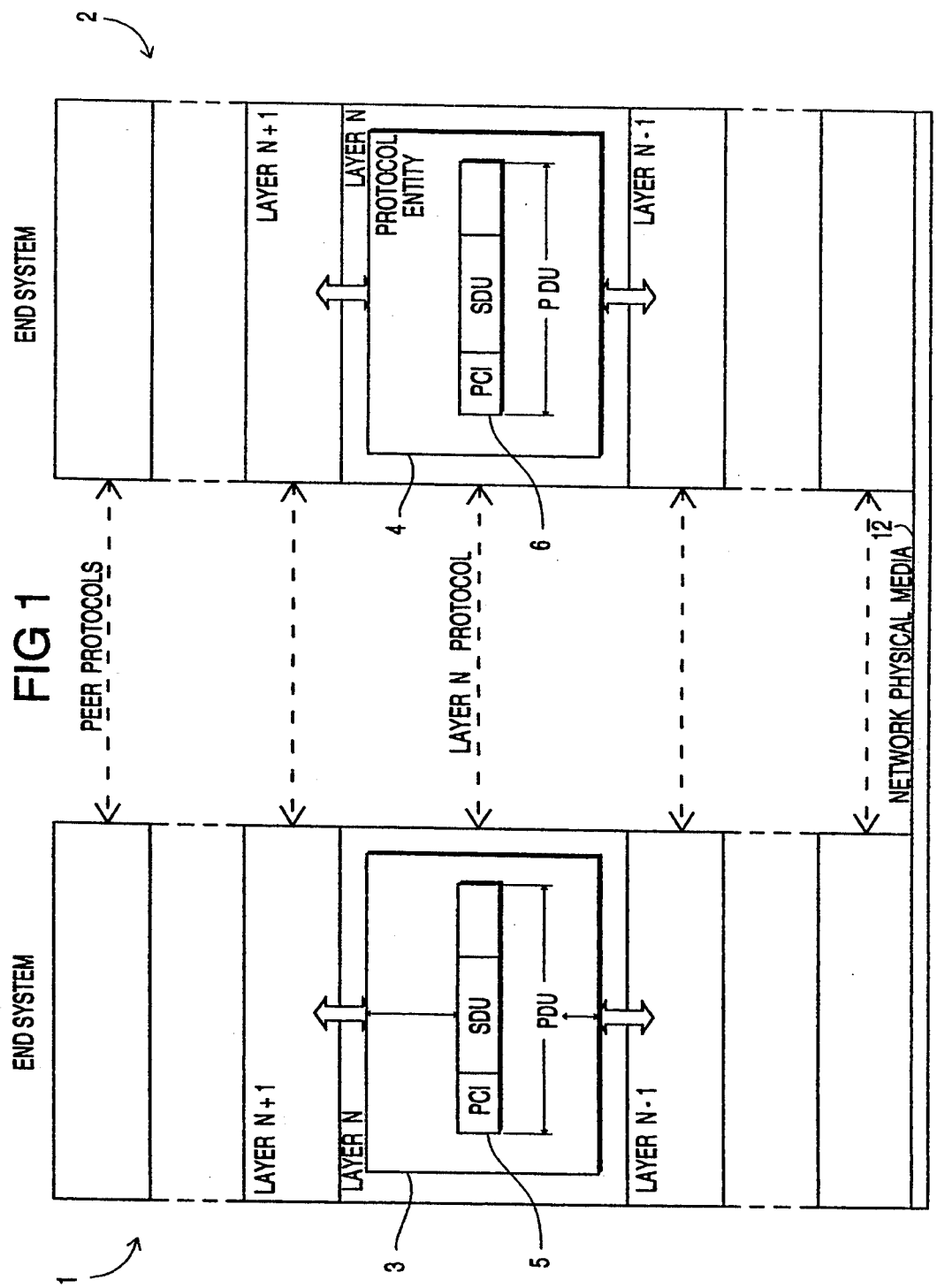
FIG. 1 is a diagram illustrating protocol stacks of two communicating end systems.

FIG. 1 shows conceptual protocol stacks 1 and 2 operated by two end systems in communicating with each other over a network. Each of protocol stacks 1 and 2 is made up of a number of different layers, and each performs a particular task in the communication process. Layer N in protocol stack 1 and 2, provides services to the layer above (layer N+1) and in doing so utilizes services provided by the layer below (layer N−1).

Within each layer N, a protocol entities 3 and 4 control the carrying out of the communication tasks assigned to that layer. This control is effected in coordination with the corresponding protocol entities of the communicating end system. Conceptually the protocol entities 3 and 4 in the same protocol layer of the communicating end systems communicate and coordinate with each other in accordance with a peer protocol (for layer N this is the layer N protocol shown in FIG. 1). The peer protocol defines the form and sequencing of messages passed between the peer protocol entities 3 and 4 in the form of protocol data units 5 and 6. Each of protocol data unit (PDU) 5 and 6 contains protocol control information PCI and one or more service data units SDU, the latter being data which the layer N protocol entity is handling on behalf of the layer N+1 above.

While conceptually the peer protocol entities 3 and 4 are communicating with each other by passing PDU's 5 and 6 directly between themselves, in practice, PDU's 5 and 6 must pass down one protocol stack, across the network 12 and up the other protocol stack to the relevant layer N. A protocol data unit passed by the protocol entity of layer N down to layer N−1 is treated by that latter layer as a service data unit SDU and handled appropriately.

Such conceptual layering of communication protocol stacks is well known in the art. For example, the sevenlayer OSI (Open Systems Interconnect) model is defined by the International Standards Organization (International Standard ISO7498). It will be appreciated that in practice the protocol stacks are implemented primarily in software, although the lower levels may well be effected using dedicated hardware.

A protocol entity can be arranged to simultaneously handle multiple connections for data transfer among different end-system processes. In this case, it is necessary for each connection to be uniquely identified so that the entity knows which PDU relates to which connection. Protocol entities running the well known transmission control protocol (TCP) use pairings of endpoint to identify a connection where an endpoint is the combination of a IP address parameter identifying the end system concerned (or, more accurately, an interface of the end system to the network), and a port number parameter indicating the source/destination within the end system with which the TCP entity is to communicate. A fuller explanation of TCP connection identification may be found in a reference work such as "Internetworking with TCP/IP", Douglas E. Comer, Volume 1, Second Edition 1991, Prentice-Hall.

From the foregoing, it can be seen that even when only a single pair of end systems intercommunicates, a number of different protocols are being simultaneously operated at different levels between pairs of protocol entities for effectively conducting communication connections.

Figure 2:
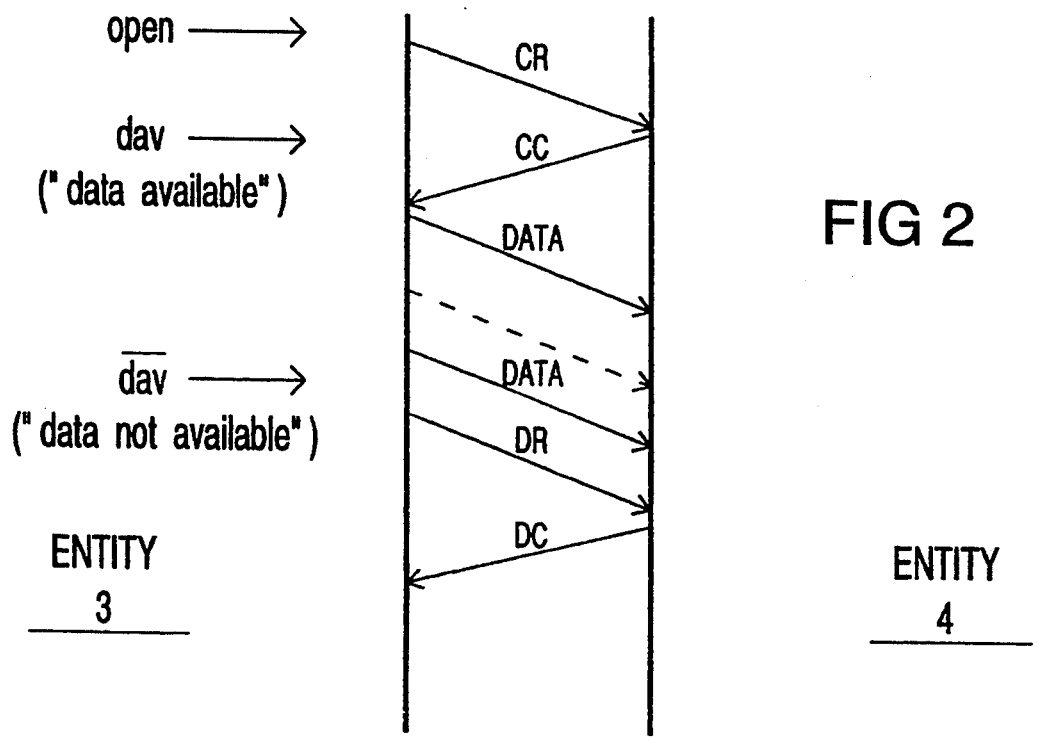
FIG. 2 is a diagram illustrating an allowed sequence of protocol-data-unit types exchangeable between corresponding protocol entities according to a pre-determined protocol.

The peer protocol controlling communication between corresponding protocol entities will often specify that certain types of PCI must be preceded and/or followed by certain types of other protocol data units. FIG. 2 illustrates for a simple protocol a typical allowable sequence of protocol data units types. More particularly, in response to a request "Open" from the protocol layer N+1 to establish a communicating connection, the protocol entity 3 sends a connection request (CR) via a corresponding protocol data unit to its peer protocol entity 4 in the end system with which it desires to establish communication. On receiving this request, the peer entity 4 returns a connection confirm (CC) message (assuming that the entity 4 is ready to receive data). Thereafter, while data is available to the entity 3 as indicated by a signal "dav," the protocol entity 3 sends data in protocol data units to the protocol entity 4. In due course, when no more data is available and the protocol entity 3 sends a disconnect request (DR) and the entity 4 responds with a disconnect confirm (DC) message.

Figure 3:
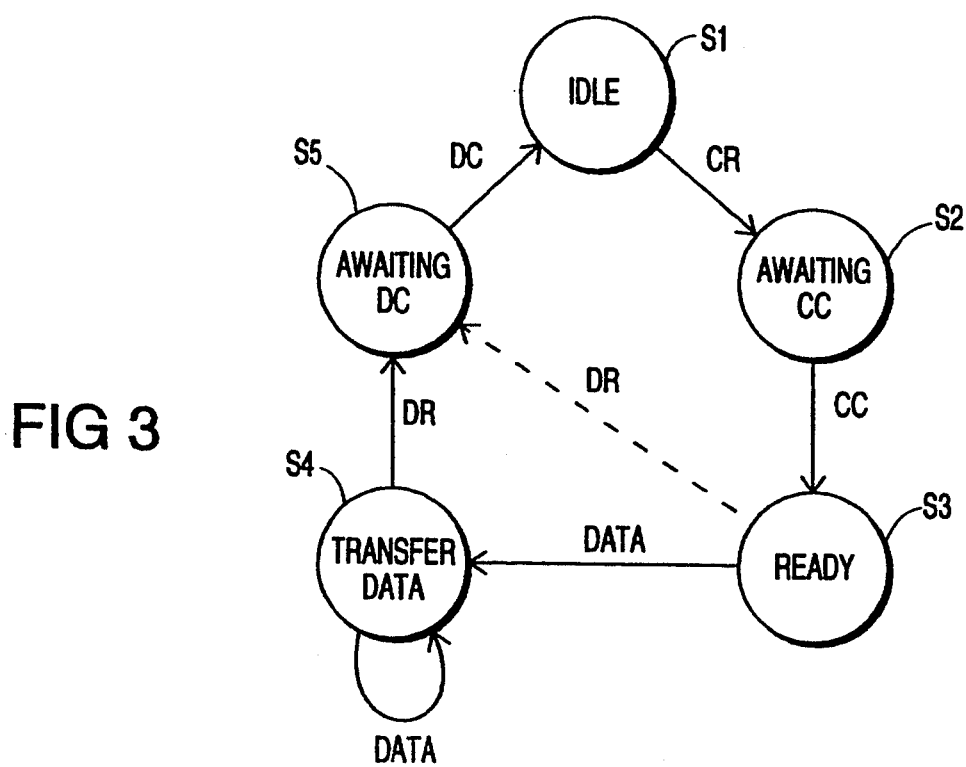
FIG. 3 is a state transition diagram for the protocol associated with FIG. 2, considered from the point of view of the overall connection established between the communicating protocol entities.

The protocol governing communication between the entities 3 and 4 can be viewed in terms of the allowable sequences of protocol data units that can appear on the network 12. FIG. 3 is a state transition diagram for the protocol used for the FIG. 2 communication viewed this way. The state transition diagram of FIG. 3 comprises five states S1 to S5 with transition between the states occurring in correspondence to particular types of protocol data units being transferred across a network. It will be appreciated that this view of the protocol is very much a connection view as seen from the network and is a passive one (i.e, no actions are consequent on a change of state). More particularly, initially no connection is present between the protocol entities 3 and 4, and the connection is effectively in its Idle State S1. In due course, one protocol entity will seek to establish communication with a peer protocol entity and a communication request (CR) will appear on the network moving the overall connection to an "awaiting CC" state S2 in which the connection is next expecting to see a connection confirm (CC) protocol data unit. When such a protocol data unit arrives, the connection moves into a "ready" state S3 indicating that both the protocol entities 3 and 4 are ready for the transfer of data. In due course, a first data-bearing protocol data unit is passed over the network and the "transfer data" state S4 is accordingly entered. As further data is transferred, the connection remains in its transfer data state S4. When data transfer is complete a disconnect request (DR) will appear on the network and the connection moves into its "Awaiting DC" state S5 in which the next expected message will be a disconnect confirm one. When this latter message passes over the network, the connection moves back into its Idle State S1.

The state transition diagram in FIG. 3 also provides for one further transition, this being a transition from the ready state S3 directly to the "Awaiting DC" state S5 in response to the receipt of a disconnect request (DR) message before any data is transferred. This transition is shown in dashed lines in FIG. 3 because although it is an allowable transition, it is unusual for a connection to be closed down without the transfer of any data.

It will be appreciated that the protocol represented by FIG. 3 is a very simple one and that, in fact, the state transition diagram does not adequately deal with all eventualities. However, the protocol described above with reference to FIGS. 2 and 3 is only illustrated for the purposes of explaining the operation of the protocol analyzer of the invention and does not, of course, form any part of the present invention.

As already noted, each protocol entity may, in fact, be running more than one communication connection at any one time with each such connection being at a different state in its protocol cycle. If this is the case, the protocol control information part of each PDU will contain sufficient information to associate the protocol data unit with a particular connection being run by the protocol entity.

Figure 4:
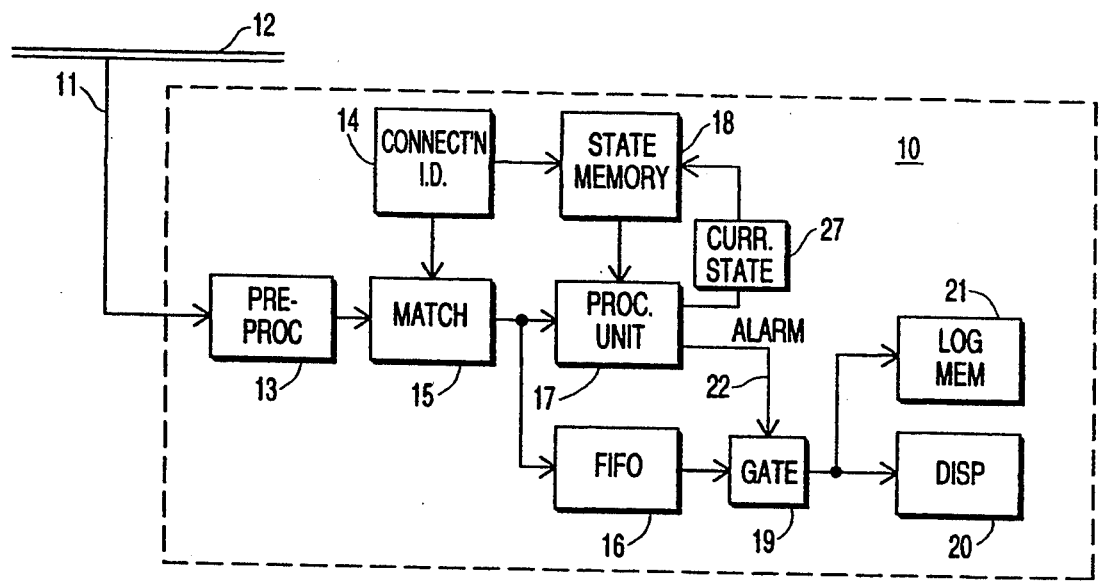
FIG. 4 is a block diagram of the protocol analyzer embodying the invention.

Referring to FIG. 4, the protocol analyzer 10 embodying the invention is connected by an input line at 11 to a channel 12 in the data network being monitored (obviously the analyzer can be attached instead to a node of the network). The analyzer is thus fed with the packets passing along the channel 12.

Each packet on the channel 12 is picked off and fed to a pre-processing unit 13, which identifies and separates the various components of the packet including, connection-identifying parameters. The connection identifying parameters to be monitored are set by the user and stored in a connection I.D. store 14. These parameters include end-system pairing, protocol entities involved, and a parameter for distinguishing between multiple connections involving the same entities. The stored connection-identifying parameters are compared against those derived by the unit 13 in a match unit 15 to identify PDUs relevant to the connection of interest. The match unit 15 passes on the type of each relevant PDU to a FIFO store 16.

The PDU types passing through the unit 15 are also fed to a protocol-follower constituted by a processing unit 17, a current state memory 27 and protocol state memory 18. Current state memory 27 holds the current state of the protocol relevant to the connection under consideration, and a protocol state memory 18 holds data that indicates for each state of the relevant protocol, what types of PDU are validly received when that state is the current state, and what state transition, if any, is caused by such PDU type. When several protocols are being simultaneously operated (for example, peer protocols of different layers of the protocol stacks of two communicating end systems), the part of the memory 18 holding data on the protocol relevant to the connection being monitored, is selectively enabled by an appropriate enabling signal generated by the connection identification unit 14.

For each PDU type passed on by the match unit 15, the processing unit 17 determines by reference to the data held in the memory 18, whether the type is a valid one for the current protocol state. Where the PDU type is not a valid one, the unit 17 generates an alarm signal on line 22 which enables a gate 19, allowing the sequence of PDU types leading up to the protocol violation, as well as the violating PDU type, to pass to a display unit 20 and a log memory 21. If the PDU is a valid one, the processing unit 17 updates the memory 27 to hold the new current protocol state of the connection.

Sequences violating the protocol are thus displayed to the user on the display unit 20, and stored in the log memory 21 for later analysis. The user can see not just the protocol-violating PDU type but the whole sequence leading up to it, because on a protocol violation, that whole sequence is stored in FIFO 16. The gate 19 is kept enabled while the whole sequence passes through it.

Figure 5:
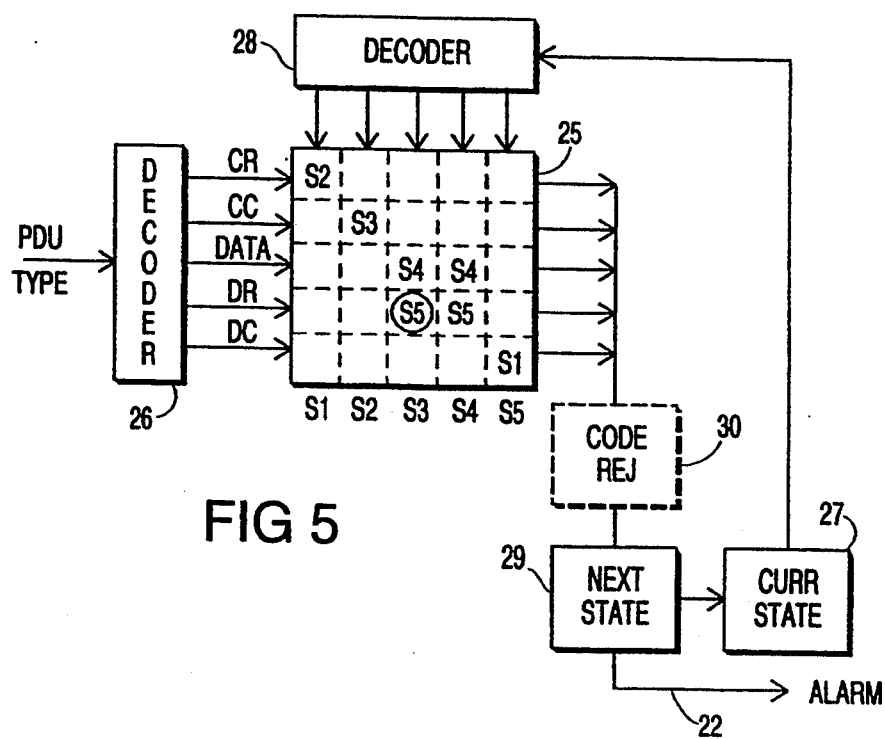
FIG. 5 is a more detailed block diagram of a protocol state memory and processing unit of the FIG. 4 protocol analyzer.

FIG. 5 is a block diagram of the protocol-follower shown as units 17, 18 and 27 in FIG. 1. Though the division into those units is functional, the various components illustrated in FIG. 5 that go to make up the units 17 and 18 cannot readily be separated. By way of example, the protocol-follower will be described below in relation to the protocol illustrated in FIGS. 2 and 3.

The protocol state transition table (FIG. 3) is effectively stored in a matrix store 25. In this store, the columns represent the states (S1 to S5), and the rows represent the PDU types (CR, CC, DATA, DR, and DC) which cause state transitions. For each possible transition (from a current state to a next state in response to a PDU type), the matrix store 25 contains the next state code in the element at the intersection of the column for the current state and the row for the PDU type. Thus the transition from state S3 induced by a PDU type DATA is to state S4, and is stored by the code S4 in the element at the intersection of column S3 and row DATA. All other matrix store locations contain null entries.

The incoming PDU type from unit 15 is fed to a row decoder 26 to select the appropriate row of the matrix 25. Also, the current state stored in the current state memory 27 is passed to a state decoder 28 to select the appropriate column of the matrix 25. If the element so selected by the row and column contains a state code, that code is read and passed to a next state store 29. The presence of a state code in the element indicates that the PDU type is a valid one. If, however, the selected element does not contain a state code, the next state store 29 will remain empty. This condition, which is caused by an invalid PDU type, is indicated by an alarm signal on the line 22.

After the matrix store 25 has been read and the new state (if any) read into the next state store 29, the contents of the next state store 29 are transferred to the current state memory 27 (so erasing its previous contents) in readiness for the reception of the next PDU type. The circled entry for state S3 and row DR is the permitted but abnormal transition mentioned above. If desired, this entry may have a distinguishing code attached to it, with the output of the matrix 25 being fed to the next state store 29 via a code rejection unit 30 which can be enabled or disabled at the option of the user. If disabled, the unit 30 will allow all state values to pass. On the other hand, if enabled, it will allow only state values without a distinguishing code to pass. This implements the strong and weak filtering option described above.

Also, means may be provided whereby the user can enter and store selected transitions (i.e. selected PDU type sequences), which are then inhibited from being recognized as violations, and/or suppress selected transitions, which are then treated as violations. This may be done by providing a user-modifiable matrix which is operated in parallel with the main protocol state table (matrix store 25).

The gate 19 can of course be arranged to allow all packet types emerging from the FIFO 16 and to merely add a distinguishing tag to protocol-violating packet types, with the display unit 20 displaying tagged packet types in a distinctive manner.

Figure 6:
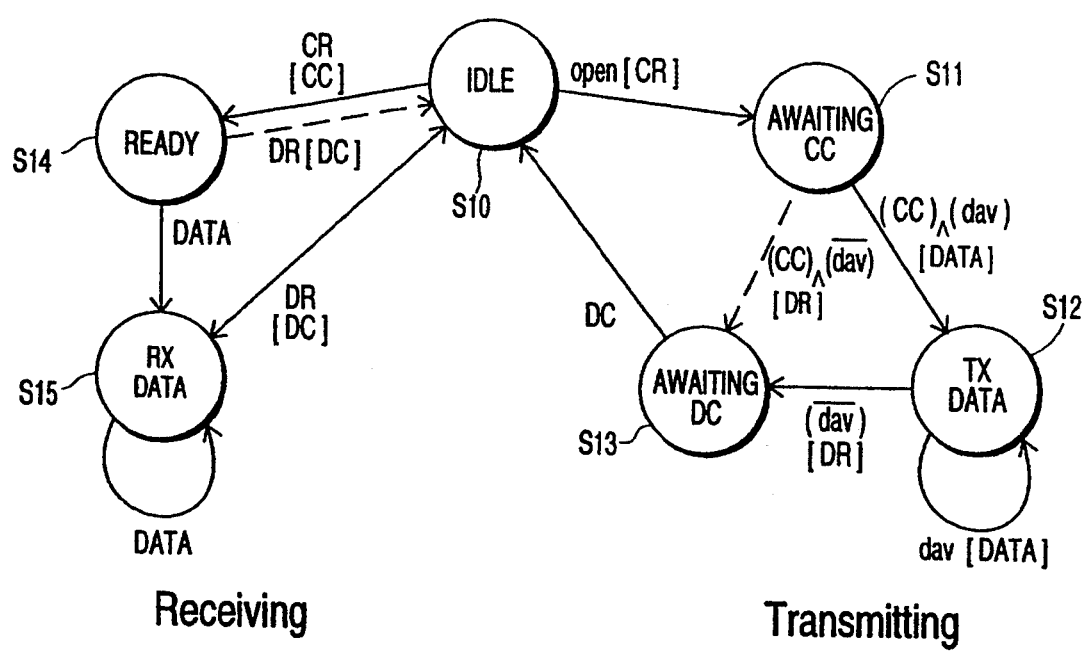
FIG. 6 is a state transition diagram for the protocol associated with FIG. 2, considered from the point of view of the two communicating protocol entities.

As already noted, the state transition diagram of FIG. 3 views the protocol governing the connection of interest, strictly in terms of the connection across the network and what PDU types pass over the network. It is also possible to specify the protocol considered from the point of view of the protocol entities themselves, although such a specification will generally involve primitives passed between protocol layers as well as the PDU types. Thus, FIG. 6 illustrates the protocol associated with FIGS. 2 and 3 in terms of a state transition diagram as implemented by the communicating protocol entities. In this diagram, the PDU types (CR, CC, DATA, DR, DC) and primitives ('open', 'dav') causing state transitions are shown on the arrows between states, whilst the actions initiated by a state transition are shown in square brackets.

As can be seen, the FIG. 6 state transition diagram comprises six states S10–S15, one of which (state S10) is an Idle State, three of which (S11–S13) are associated with data transmission, and the remaining two of which (S14, S15) are concerned with data reception. Since FIG. 6 is self-explanatory and will be readily understood by persons skilled in the art, a detailed textual description will not be given. The main point to note is that the diagram differs from that of FIG. 3 in certain aspects.

The protocol analyzer can be arranged to follow the progress of a connection in terms of a state transition in FIG. 6 rather than that in FIG. 3. In this case, although the matrix store 25 need only contain one copy of the relevant state transition data, it is generally advantageous for the analyzer to separately follow the progress of the connection at the two communicating entities. The current state memory 27 must now hold two current states, one for each entity. Furthermore, each relevant PDU now has two different aspects. Firstly, PDU serves to indicate that the sending protocol entity has carried out an action from which it can generally be deduced that the sending protocol entity has passed from its current state into another state. Secondly, PDU serves to indicate what state transition the receiving protocol entity is about to undergo. However, because PDU type is not the sole determinant of state transitions, there may well be ambiguity existing at least for a limited period, when PDU type alone is used to follow a complex protocol represented in terms of a state transition diagram as viewed by a protocol entity. Accordingly, it is preferred to use a diagram that relies solely on PDU type (such as that of FIG. 3) when implementing the protocol analyzer of the invention.

We claim:

1. A network protocol analyzer for monitoring a selected communication connection in accordance with a predetermined protocol between two entities by the exchange of protocol data units over a data network, said protocol being a cyclically-operating and having multiple states, a transition between said states are conditioned on said protocol data units, and said data network supporting a plurality of simultaneous communication connections between multiple pairs of said entities, said analyzer comprising:

(a) monitoring means for monitoring the network;
   (b) connection-selection means connected to the monitoring means for selectively identifying said protocol data units relevant to said selected communication connection and for deriving protocol-units relevant to said selected communication connection;
   (c) connection I.D. storing means connected to said connection-selection means for providing information for identifying said relevant selected communication connection;
   (d) protocol-follower means including current-state memory means for storing a current protocol state of said selected communication connection, said protocol-follower means being conditioned in dependence on said states of said protocol, when one of said predetermined protocol data units is validly received for said current protocol state, a change to another of said states being caused in relation to said selected communication connection according to said protocol from the current protocol state as indicated by said current-state memory means, said protocol-follower means undating said current protocol state in said current-state memory means; and
   (e) alarm means in response to said protocol-follower means for providing an output indication when a said relevant protocol data unit, as represented by the corresponding protocol is an invalid one for said current protocol state.

2. A network protocol analyzer according to claim 1, including output means controlled by said alarm means to generate a protocol-data-unit-representing output only for each protocol data unit indicated as invalid by said alarm means.

3. A network protocol analyzer according to claim 1, including output means operative to generate a protocol-data-unit-representing output for each said relevant protocol data unit, the output means being controlled by said alarm means to distinguish invalid protocol data units from valid protocol data units.

4. A network protocol analyzer according to claim 1, including output means controlled by said alarm means and operative to generate a protocol-data-unit-representing output for each of a limited number of valid relevant protocol data units that immediately precede an invalid protocol data unit as well as for the invalid protocol data unit itself.

5. A network protocol analyzer according to claim 1, wherein said protocol-follower means is conditioned in dependence on said protocol as considered in terms of the possible states of the overall connection having regard solely to protocol data units exchangeable between said entities.

6. A network protocol analyzer according to claim 1, wherein said protocol-follower means is conditioned in dependence on said protocol as considered at the communicating entities, the protocol-follower means being operative to track the progress of the connection of each communicating entity separately with the current protocol state of each entity being held in said current-state memory means.

7. A network protocol analyzer according to any one of claims 1, 5 and 6 wherein said protocol-follower means includes:

(a) state memory means for storing for each state of aid protocol, state data indicating what types of protocol data units are validly receiving in that state and any resulting change in state caused by each validly-received protocol data unit, and
   (b) processing means operative to follow the execution of said protocol, by examination of each said protocol-unit signal with reference to said state data associated with the current protocol state.

8. A network protocol analyzer according to claim 7, wherein said state memory means comprises a two-dimensional look-up table accessed by current state and protocol-data-unit type as indicated by said protocol-unit signal, said table having for each state, a valid-unit entry for each protocol-data-unit type validly received in that state and an invalid-unit entry for invalid protocol-data-unit types, each said valid-unit entry indicating the protocol state following receipt of that protocol-data-unit type concerned, and said processing means accessing said table in dependence on the current protocol state and the type of the protocol data unit under consideration, whereby to ascertain whether that protocol-data-unit type is valid for the current state and, if so, the identity of the next protocol state.

9. A network protocol analyzer according to claim 8, wherein the conditioning of said protocol-follower means is user modifiable.

10. A network protocol analyzer according to claim 8, wherein the protocol-follower means is so conditioned as to permit the user to select predetermined protocol data units that are otherwise valid in particular protocol states, for identification by said alarm means when occurring in those states.

11. A network protocol analyzer for detecting an invalid protocol data unit on a network, comprising:

(a) monitoring means for monitoring protocol signals relevant to a selected communication connection in said network;
   (b) connection I.D. storing means connected to said monitoring means for providing information for identifying said selected communication connections,
   (c) protocol-follower means responsive to said monitored protocol data unit for determining whether said monitored protocol data unit for said selected communication connection is valid based upon a current protocol state, and
   (d) alarm means in response to said protocol-follower means to provide an invalid monitored protocol data unit.

12. A network protocol analyzer according to claim 11, wherein said protocol-follower means is conditioned in dependence on predetermined states of the overall connection between communication entities according to said protocol.

13. A network protocol analyzer according to claim 11, wherein said protocol-follower means is conditioned in dependence on and tracking current states of each of communication entities according to said protocol.

14. A network protocol analyzer according to claim 11, wherein the conditioning of said protocol-follower means is user modifiable.

15. A network protocol analyzer according to claim 11, wherein said protocol-follower means further comprises:
   (a) state memory means for storing predetermined valid protocol data units for each state of said protocol;
   (b) current-state memory means for storing an indication of said current protocol state of said selected communication connection,
   (c) means for cumulatively storing said monitored protocol data units of said selected communication connection prior to an occurrence of invalid protocol data unit; and
   (d) processing means for detecting whether said monitored protocol data unit for said selected communication connection is valid based upon said current protocol state stored in said current state memory means and said predetermined valid protocol data unit store in said state memory means, upon detecting an invalid monitored protocol data unit, said processing means generating an alarm signal.

16. A network analyzer according to claim 15, wherein said state memory means further comprises a two-dimensional look-up table, said table having for each state valid and invalid entries for protocol data units, said processing means operatively coupled to said table in dependence on said current protocol state and said protocol data unit under consideration for determining whether that said protocol data unit is valid for the current state to output a next protocol state.

17. A network protocol analyzer according to claim 15, wherein said alarm means further comprises:
   (a) log memory means for logging said monitored protocol data units in said cumulatively storing means in a permanent medium for later retrieval;
   (b) display means for displaying said monitored protocol data in said cumulatively storing means, and
   (c) gate means responsive to said alarm signal from said protocol-follower means for enabling said monitored protocol data units in said cumulatively storing means to be available to said log memory means and said display means.

18. A network protocol analyzer according to claim 17, wherein said display means displays protocol data units for said selected communication connection, said display means being controlled by said gate means to distinguish invalid protocol data units from valid protocol data units.

19. A network protocol analyzer according to claim 17, wherein said display means is controlled by said gate means and displays a limited number of valid protocol data units of said selected communication connection that immediately precede an invalid protocol data unit as well as said invalid protocol data unit.

20. A method of monitoring a selected communication connection using a network protocol analyzer in accordance with a predetermined protocol between two entities by an exchange of protocol units over a data network, said protocol being a cyclically operating and having multiple states, a transition between said states is conditioned on different types of said protocol data units, and said data network supporting a plurality of simultaneous communication connections between multiple pairs of said entities, said method comprising the steps of:
   (a) monitoring the network;
   (b) selectively identifying said protocol data units relevant to said selected communication connection;
   (c) deriving a protocol-unit signal indicative of said protocol data units relevant to said selected communication connection;
   (d) storing a current protocol state of said selected communication connection in a said current state memory means, a protocol-follower means being conditioned in dependence on said states of said protocol, when one of said predetermined data units is validly received for said current protocol state, a change to another of said predetermined states being caused in relation to said selective said communication connection according to said protocol,
   (e) updating said current protocol state in said current state memory means; and
   (f) providing an output indication as an alarm when a said relevant protocol data unit is invalid for said current state protocol state.

* * * * *